Patented July 25, 1950

2,516,604

UNITED STATES PATENT OFFICE 2,516,604

METHOD OF PREPARING NUCLEATING AGENT AND USE OF SAME IN HYDROLYZING TITANIUM SALT SOLUTIONS IN PRODUCTION OF TITANIUM OXIDE PRODUCT

Charles A. Tanner, Jr., Collingswood, N. J., assignor to American Cyanamid Company, New York, N. Y., a corporation of Maine No Drawing. Application May 31, 1946, Serial No. 673,607

6 Claims. (Cl. 23—202)

This invention relates to the preparation of titanium dioxide pigment, and relates more particularly to the provision of a nucleating agent for hydrolyzing titanium salt solutions to obtain hydrous titanium oxide in noncrystalline form from which the hydrous oxide may be converted by calcination treatment to titanium dioxide pigments having either rutile or anatase crystal structure.

Titanium dioxide, within recent years, has become widely accepted as the outstanding white pigment material used in the coating and allied industries. This popularity is due mainly to its whiteness, stability, hiding power, higher tinting strength, and ready dispersibility in a variety of vehicles. It is prepared mainly by the hydrolysis, under carefully controlled conditions, of titanium sulfate solutions containing iron, prepared by digestion of titanium-bearing ores with sulfuric acid, followed by reduction of all ferric iron to ferrous iron, removal of a part of the iron by crystallization as ferrous sulfate, and clarification and adjustment of concentration. The hydrolysate is calcined, in the presence of various conditioning agents to produce the desired white pigment.

The hydrolysis treatment is carried out on the liquors obtained from the sulfuric acid digestion of titanium-bearing ores, after the liquors have been subjected to the various clarification treatments referred to above. These liquors, ordinarily containing from about 12% to about 15% titanium dioxide, may be employed in the method of the present invention as they are received from the clarification treatment, thus providing a decided advantage over the methods of prior procedure.

It is a principal object of the present invention to provide a method of hydrolyzing titanium sulfate solutions in a relatively inexpensive manner. A further object of the invention resides in the provision of hydrous titanium oxides of optimum particle size and of a desirable texture. Another object of the invention is the production of hydrolyzed titanium dioxide of noncrystalline structure which may be easily converted to either anatase or rutile form by ordinary calcination methods. Additional objects of the invention will become apparent to those skilled in the art from the following detailed description.

Copending application, Serial No. 429,118 of L. E. Ross and C. A. Tanner, Jr., now Patent No. 2,494,492, describes a method for the preparation of a calcination seed material which is especially adapted for converting hydrous titanium dioxide, obtained by the hydrolysis of titanium sulfate solutions, to titanium dioxide having rutile crystal structure. This rutile calcination seed is prepared by treating an alkali metal titanate with certain definite quantities of a monobasic acid such as hydrochloric acid. The alkali metal titanate is prepared by heating an aqueous pulp of substantially pure hydrated titanium dioxide, containing a small amount of combined and/or adsorbed sulfuric acid, obtained by thermal hydrolysis of a titanium sulfate solution with an excess of an alkali metal hydroxide solution for a period of time ranging from about 1 hour to about 6 hours. The alkali metal titanate so formed is washed to remove excess alkali and is subsequently boiled in the presence of an amount of monobasic acid which is in sufficient excess over the amount required to neutralize the alkali metal present to yield from about 20% to about 50% of the theoretical for the formation of the normal tetra-salt of the monobasic acid.

The seed so produced is not a nucleating agent for hydrolyzing titanium sulfate solutions since it does not accelerate the precipitation of hydrous titanium oxide when introduced into a titanium sulfate liquor prior to hydrolysis, but is carried through as an inert material.

The present invention is based on the discovery that the alkali metal titanate obtained according to the method of the above identified application may be converted to an effective hydrolysis nucleating agent by neutralizing the alkali present in the material with an acid material such as hydrochloric acid or the like under certain carefully controlled operating conditions. It is an essential feature of this invention that the acid treatment is terminated short of conversion of any of the hydrated titanium dioxide to titanium tetrachloride inasmuch as it has been shown that the titanium halides do not function as titanium sulfate hydrolysis nucleating agents. Because the nucleating agent of this invention is not subjected to a heat treatment during the acid treatment, it is therefore not converted to a material having definite crystalline structure, but is, rather a hydrated titanium dioxide which has been shown by microscopic and X-ray diffraction analysis to have no definite pattern of crystalline structure.

The improved nucleating agent of the present invention is prepared from a conventional titanium sulfate hydrolysate. Although the exact composition of this hydrolsate is not known, it is believed that its composition is best described by the formula: $10TiO_2 \cdot 10H_2O \cdot xSO_3$. Upon treatment of this material with, for example, sodium hydroxide solution by boiling the components for a period of time within the range of from 1 to 6 hours, a water insoluble product is obtained which contains from about 80% to about 86% $TiO_2$ and from about 20% to about 14% $Na_2O$ by analysis, depending on the time of boiling. These analyses correspond to the compounds $NaTi_5O_{11}$ and $Na_2Ti_3O_7$, respectively.

This water-soluble product, containing from about 80% to about 86% $TiO_2$ and from about 20% to about 14% $Na_2O$ by analysis, is slurried with dilute aqueous HCl, at room temperature to remove the sodium therefrom in the form of sodium chloride. The salt formed may be readily removed by leaching the insoluble product with water. The amount of HCl employed is preferably such that the sodium is entirely removed from the alkali metal titanate, inasmuch as it is desired that the product be substantially pure hydrated titanium dioxide. An excess of HCl may be employed if desired, the upper limit of acid addition being entirely dependent upon economic practicability in that the excess acid is removed during the subsequent water leaching treatment in such dilute concentration as to preclude its recovery. The acid-treated water-leached product is a titanium dioxide complex, corresponding to the formula $H_2TiO_3.xTiO_2$, which functions extremely efficiently as a titanium sulfate hydrolysis nucleating agent.

During the acid treatment of the sodium titanate, the temperature of the aqueous slurry of the components is purposely maintained at room temperature to avoid any possibility of peptization of the titanium dioxides. When elevated temperatures, such as the boiling temperature of the slurry, are employed, the formation of crystalline titanium tetrachloride is induced. It is necessary to avoid formation of this crystalline compound for the reason that it is not a hydrolysis nucleating agent, being rather an inert material unsuitable for the purposes of this invention.

The nucleating agent of this invention differs very decidedly in its nucleating action from previous hydrated titanium dioxides which have been used as hydrolysis nucleating agents for titanium sulfate solutions. One advantageous difference of the present invention resides in the fact that my novel nucleating agent, upon addition to titanium sulfate solutions at relatively elevated temperatures, is very rapidly transformed to colloidal $TiO_2$. Thus, the entire amount of $TiO_2$ nuclei formed is present in the solution at the beginning of the hydrolysis treatment and is available at the time when the titanium sulfate has become sufficiently hydrolyzed so that $TiO_2$ is formed. This freshly formed $TiO_2$ adheres to the individual nuclei and is subsequently precipitated in uniform size. The nuclei of this invention are very stable and of uniform characteristics, remaining unchanged after storage for several months at room temperature. Heretofore, according to prior procedures, the formation of nuclei was a continuing process in which the difficulties of controlling the formation of the desired quantity of properly aged nuclei often resulted in non-uniform products. When too few nuclei were present, the titanium dioxide built up on the few nuclei, resulting in a low yield, and forming a hydrolysate of large particles which overburned on calcination before optimum pigment properties were attained. On the other hand, when excess nuclei were present precipitation was too rapid, resulting in the depletion of the titanium dioxide content of the titanium sulfate solution and preventing proper particle growth. The hydrolysate obtained was difficult to filter and purify, and resulted in a hard, sintered calcination product of extremely poor texture and color.

A further advantage resulting from the use of my novel nucleating agent resides in the fact that titanium sulfate solutions containing from about 12% to about 16% $TiO_2$, which represents the normal concentration of titanium sulfate liquors obtained from the clarification process, may be satisfactorily hydrolyzed. Formerly it has been the practice to increase the concentration of $TiO_2$ content of the titanium sulfate solutions to at least 16%, thus necessitating expensive vacuum evaporation treatment.

It has been found that titanium sulfate solutions of widely varying acidity may be satisfactorily employed. However, optimum results have been obtained when employing titanium sulfate solutions having a Basicity Factor of from about 25 to about 30, wherein basicity represents the per cent of acid lacking to form the theoretical titanium sulfate of the formula $Ti(SO_4)_2$. Hydrolysis treatment accorded these preferred solutions results in the formation of hydrous titanium oxide particles of desirably uniform size.

The hydrolysis treatment is preferably carried out by mixing an aqueous dispersion of the nucleating agent, at about 20% solids content, with the titanium sulfate liquor at a temperature of about 50° C. If desired, the mixing procedure may be reversed and the liquor may be added to an aqueous slurry of the nucleating agent. The mixture is then heated to boiling and is boiled for a period of from about 1 to about 5 hours. It has been found that addition of water during the boiling period, to maintain the desired acid concentration, increases the rate of hydrolysis so that precipitation of substantially all of the $TiO_2$ present in the titanium sulfate solution may be accomplished in about 2 to 3 hours. If desired, the heating period may be further shortened by carrying out the hydrolysis treatment in an autoclave under increased temperature and pressure. Although a temperature of about 50° C. has been indicated as being convenient during the addition of the nucleating agent to the titanium sulfate solution, the liquor may be heated to any temperature desired as from room temperature to about 100° C. or even higher if an autoclave is used. The amount of nucleating agent which is employed in the method of the present invention may vary from about 0.5% to about 6% based on the amount of $TiO_2$ present in the titanium sulfate solution, the addition of about 3% of the nucleating agent having been found to produce hydrous titanium oxide having a particle size which permits optimum calcination results.

In order that the invention may be more readily understood, the following specific examples are given. It will be understood, however, that the examples are primarily for the purpose of illustration, the scope of the invention being defined by the appended claims.

*Example 1*

To an aqueous pulp of substantially pure hydrated titanium dioxide containing a small amount of combined and/or adsorbed sulfuric acid, obtained by hydrolytic precipitation from titanium sulfate solution and containing 100 g. of titanium dioxide at about 30% solids content, was added 150 g. of sodium hydroxide while stirring continuously. The mixture was heated for about 2 hours at a temperature of about 85° C. to 90° C., the mixture being maintained at a constant volume. The titanate thus formed was diluted with water, filtered, and washed substantially free of sulfates and excess alkali.

The filter cake was slurried in 2 liters of water, at room temperature, to which was added 75 cc. of commercial HCl. The mixture was agitated for several minutes to insure complete reaction between the sodium present and the HCl, after which the mixture was filtered. The residue was then water-washed to remove any remaining traces of NaCl.

Example 2

To 3000 g. of aqueous titanium sulfate solution containing 15.1% $TiO_2$ which had been heated to 50° C. was introduced 11.4 g. of an aqueous slurry of the hydrated $TiO_2$ of Example 1 containing the equivalent of 2.25 g. (0.5%) of $TiO_2$. The mixture was heated and boiled for 1 hour. Over a period of 30 minutes 450 cc. of water was added, and the mixture was boiled for an additional 1½ hours. The yield of hydrous titanium oxide was 94.9%. The product was calcined in the presence of a rutile seed, the resulting pigment having very good color characteristics and a tinting strength of 1550.

Example 3

The procedure employed was the same as that of Example 2 except that 3% of the nucleating agent of Example 1 was added to the liquor. The yield of hydrous titanium oxide was 95.6%. The product obtained was calcined to rutile titanium dioxide pigment and had good color characteristics and a tinting strength of 1620.

Example 4

To 3290 g. of titanium sulfate liquor, containing the equivalent of 500 g. of $TiO_2$, at 50° C., was added 78 g. of a water slurry of the hydrated $TiO_2$ of Example 1, containing 3% of the nucleating agent calculated on the basis of the $TiO_2$ present in the sulfate liquor. The mixture was heated and boiled for 5 hours. 180 cc. of water was added over a period of 3½ hours during the boiling procedure. The yield of hydrous titanium oxide was 98.0%. The product was calcined to rutile titanium dioxide pigment and had good color characteristics and a tinting strength of 1620.

What I claim is:

1. The method of preparing a titanium sulfate hydrolysis nucleating agent which comprises the steps of boiling an aqueous slurry of purified titanium sulfate hydrolysate in the presence of an alkali metal hydroxide for from about 1 to about 6 hours, filtering the mixture, washing the excess alkali from the residue, neutralizing the combined alkali metal with hydrochloric acid, but terminating the hydrochloric acid treatment thereof short of conversion of any of the hydrated titanium dioxide to titanium tetrachloride, and thereafter washing the acid-treated material.

2. In a process for preparing titanium dioxide, the step which comprises hydrolyzing an aqueous solution of a titanium sulfate solution in the presence of a small amount of hydrated titanium dioxide, said hydrated titanium dioxide having been prepared by boiling an aqueous slurry of a purified titanium sulfate hydrolysate in the presence of an alkali metal hydroxide for from about 1 to about 6 hours, filtering the mixture, washing the excess alkali from the residue, neutralizing the combined alkali metal with hydrochloric acid, but terminating the hydrochloric acid treatment thereof short of conversion of any of the hydrated titanium dioxide to titanium tetrachloride, and thereafter washing the acid-treated material.

3. In a process for preparing titanium dioxide, the step which comprises hydrolyzing a mixture of a titanium sulfate solution, and about 0.5% to about 6%, based on the titanium dioxide present in the titanium sulfate solution, of hydrated titanium dioxide, said hydrated titanium dioxide having been prepared by boiling an aqueous slurry of a purified titanium sulfate hydrolysate in the presence of an alkali metal hydroxide for from about 1 to about 6 hours, filtering the mixture, washing the excess alkali from the residue, neutralizing the combined alkali metal with hydrochloric acid, but terminating the hydrochloric acid treatment thereof short of conversion of any of the hydrated titanium dioxide to titanium tetrachloride, and thereafter washing the acid-treated material.

4. A process for preparing hydrous titanium oxide which comprises the steps of mixing a titanium sulfate solution, containing from about 12% to about 16% titanium dioxide, at a temperature of from about 20° C. to about 100° C., and a small amount of hydrated titanium dioxide, said hydrated titanium dioxide having been prepared by boiling an aqueous slurry of a purified titanium sulfate hydrolysate in the presence of an alkali metal hydroxide for from about 1 to about 6 hours, filtering the mixture, washing the excess alkali from the residue, neutralizing the combined alkali metal with hydrochloric acid, but terminating the hydrochloric acid treatment thereof short of conversion of any of the hydrated titanium dioxide to titanium tetrachloride, and boiling the mixture for about 3 to about 5 hours, and thereafter washing the acid-treated material.

5. A process for preparing hydrous titanium oxide which comprises the steps of mixing a titanium sulfate solution, containing from about 12% to about 16% titanium dioxide and having a Basicity Factor of from about 25 to about 30, at a temperature of from about 20° C. to about 100° C., and a small amount of hydrated titanium dioxide, said hydrated titanium dioxide having been prepared by boiling an aqueous slurry of a purified titanium sulfate hydrolysate in the presence of an alkali metal hydroxide for from about 1 to about 6 hours, filtering the mixture, washing the excess alkali from the residue, neutralizing the combined alkali metal with hydrochloric acid, but terminating the hydrochloric acid treatment thereof short of conversion of any of the hydrated titanium dioxide to titanium tetrachloride, and boiling the mixture for about 3 to about 5 hours, and thereafter washing the acid-treated material.

6. A process for preparing hydrous titanium oxide which comprises the steps of mixing a titanium sulfate solution, containing from about 12% to about 16% titanium dioxide and having a Basicity Factor of from about 25 to about 30, at a temperature of from about 20° C. to about 100° C., and from about 0.5% to about 6% of hydrated titanium dioxide, said hydrated titanium dioxide having been prepared by boiling an aqueous slurry of a purified titanium sulfate hydrolysate in the presence of an alkali metal hydroxide for from about 1 to about 6 hours, filtering the mixture, washing the excess alkali from the residue, neutralizing the combined alkali metal with hydrochloric acid, but terminating the hydrochloric acid treatment thereof short of conversion of any of the hydrated titanium dioxide to titanium tetrachloride, and boiling the mixture for about 3 to about 5 hours, and thereafter washing the acid-treated material.

CHARLES A. TANNER, Jr.

REFERENCES CITED

The following references are of record in the file of this patent:

UNITED STATES PATENTS

| Number | Name | Date |
|---|---|---|
| 1,922,328 | Rhodes | Aug. 15, 1933 |
| 2,389,206 | Cauwenberg | Nov. 13, 1945 |